(No Model.)
G. M. PRICE.
JUG.
No. 379,126. Patented Mar. 6, 1888.
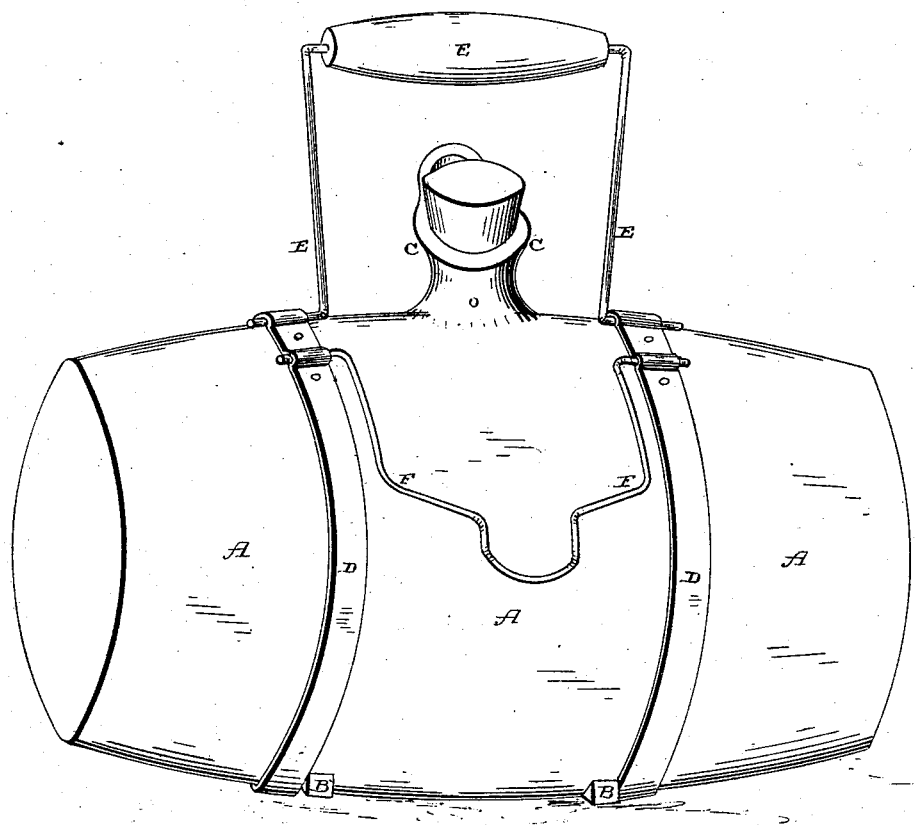
Witnesses.
L. T. Gardner
Edm. P. Ellis
Inventor.
Geo. M. Price,
per T. A. Lehmann,
atty

UNITED STATES PATENT OFFICE.

GEORGE M. PRICE, OF RUTLAND, OHIO.

JUG.

SPECIFICATION forming part of Letters Patent No. 379,126, dated March 6, 1888.

Application filed December 19, 1887. Serial No. 258,364. (No model.)

*To all whom it may concern:*

Be it known that I, GEORGE M. PRICE, of Rutland, in the county of Meigs and State of Ohio, have invented certain new and useful Improvements in Jugs; and I do hereby declare the following to be a full, clear, and exact description of the invention, such as will enable others skilled in the art to which it pertains to make and use it, reference being had to the accompanying drawing, which form part of this specification.

My invention relates to an improvement in jugs; and it consists in the combination of an earthenware jug having its outlet placed upon the top of its center and suitable metallic bands applied to the jug, and to which are attached both a handle for carrying the jug and a bent spring for attaching the jug to the horn of a saddle or to the hame of a harness, as will be more fully described hereinafter.

The object of my invention is to produce a water jug which is especially intended for use in the field, and to provide it with means whereby it can be hung upon the hame or the pommel of a saddle, and thus make it easy to transport from place to place.

The accompanying drawing represents a perspective of a jug embodying my invention.

A represents an earthenware jug of suitable shape, size, and construction, and which has on its under side suitable bearings, B, so as to support it in the proper position when placed upon the ground or any suitable support.

This jug will be preferably made of earthenware, as this material is best adapted for keeping water cool in the harvest-field and other similar places, and has its spout C formed upon the top of its center, as shown. The spout adapts the jug to be drank out of by the laborers, as well as to direct the outflowing current of water or other fluid placed in the jug, in case it should be desired to empty the fluid in some other vessel.

Passed around the jug upon opposite sides of the spout are the metallic bands D, to which the handle E and the bent spring F are fastened. Of course perforated ears may be formed upon the jug while it is being made, to receive the ends of the handle and the spring, if so desired. I do not limit myself either to the ears or the metallic bands, as this is a mere matter of choice. The handle is of the ordinary construction and enables the jug to be carried around in the hand from place to place. The bent spring F is formed as here shown, and is designed to attach the jug to the hames after the horse has been harnessed, or to the pommel of a saddle, as may be desired. In either case, owing to the curved bent shape of the spring, the jug will always be held perfectly level. The bend at the center of the spring is such that it catches around the pommel of the saddle or over the hame, and then holds the jug so that it cannot tilt or slide endwise, as it otherwise would. A spring is used in contradistinction to a rigid rod, so that the jug can have a free vertical play, and thus accommodate itself to the movements of the horse without any danger of being broken. Were a rigid rod used, the movements of the horse would have a tendency to break or bend the rod according to the weight of the jug; but as the spring F is flexible from one end to the other the motions of the horse cause the spring to have a vertical play, and thus prevent all liability of injury either to the jug or spring. When the spring is fastened around the pommel of the saddle, the spring maintains nearly a horizontal position and the jug hangs from it in such a manner that the ends of the spring have a free vertical play in proportion to the movements of the horse. By the attachment of this spring to the jug, the jug can be disposed of by attaching it to the hames or the saddle, and thus get rid of all necessity of having to carry it by hand, as is the case with jugs of the ordinary construction. This jug is especially intended for a farmer's watering-jug; but it will readily be seen that it can be used for any of the purposes to which jugs are now applied.

In order to enable the fluid to be poured out of the spout as freely as possible, an air-hole is made through one side of the spout or through some other portion of the body of the jug, as may be found desirable.

When the bent spring F is not used, it drops down against the side of the jug, so as to be entirely out of the way. This spring also forms a second handle, and can be brought into play whenever so desired.

Having thus described my invention, I claim—

1. The combination of the jug with the spring F, bent at its center, as shown, and adapted to be fastened to the pommel of a saddle or to the hames, substantially as shown.

2. The combination of a jug with the metallic bands applied thereto, a handle for carrying the jug, and the spring bent at its center for the attachment of the jug to a hame or saddle, substantially as specified.

In testimony whereof I affix my signature in presence of two witnesses.

GEORGE M. PRICE.

Witnesses:
EMIRA I. HOLT,
MAUD HOLT.